Nov. 23, 1943.   J. CANETTA ET AL   2,334,863
APPARATUS FOR DETECTING RELATION OF SPEEDS OF TWO DIFFERENT ELEMENTS
Original Filed Aug. 31, 1940    2 Sheets-Sheet 1
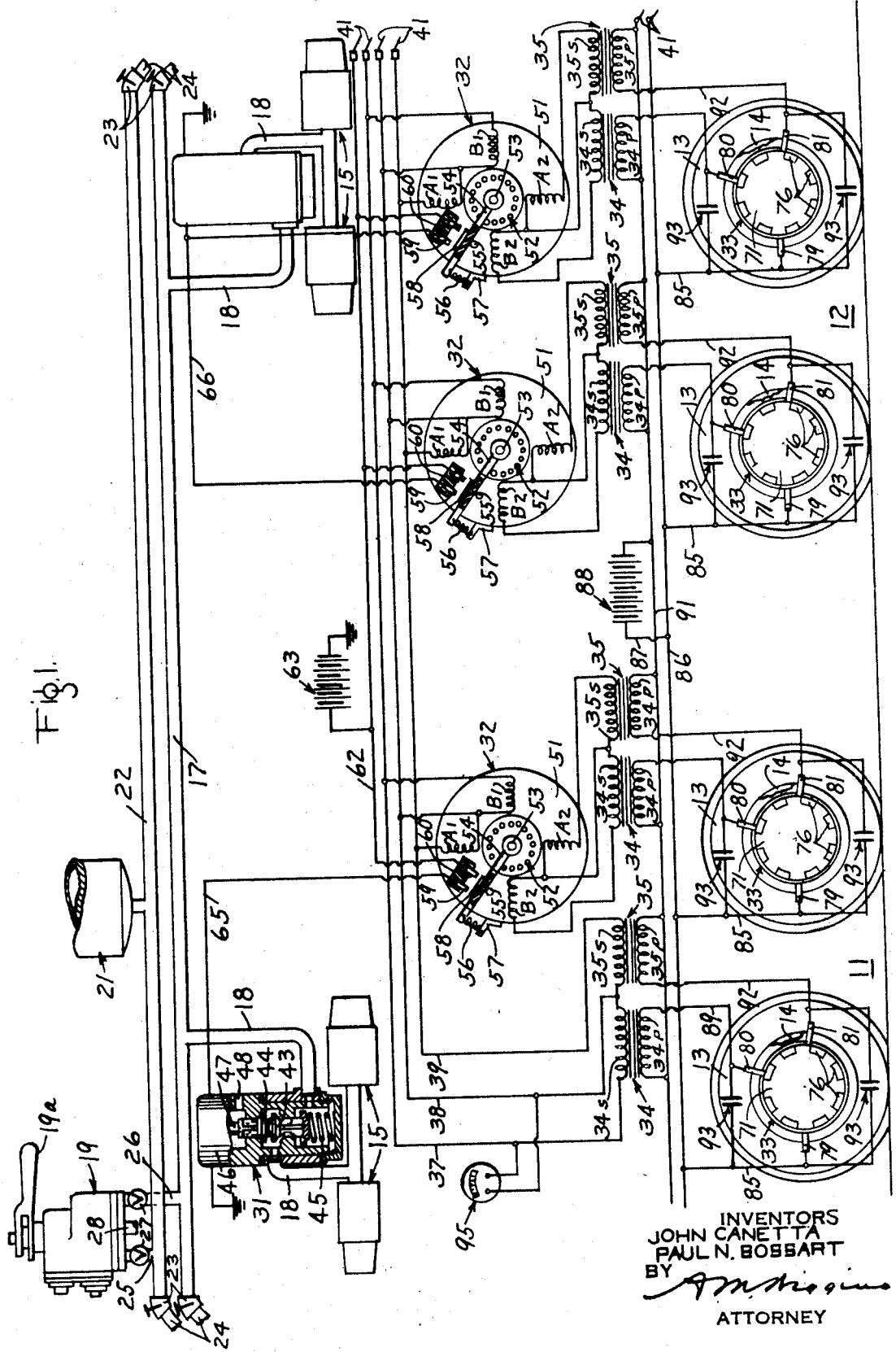
INVENTORS
JOHN CANETTA
PAUL N. BOSSART
BY
ATTORNEY Patented Nov. 23, 1943

2,334,863

UNITED STATES PATENT OFFICE 2,334,863

APPARATUS FOR DETECTING RELATION OF SPEEDS OF TWO DIFFERENT ELEMENTS

John Canetta, Wilkinsburg, and Paul N. Bossart, Cheswick, Pa., assignors to The Westinghouse Air Brake Company, Wilmerding, Pa., a corporation of Pennsylvania Original application August 31, 1940, Serial No. 354,938. Divided and this application January 30, 1941, Serial No. 376,598

5 Claims. (Cl. 175—183)

This invention relates to apparatus for detecting the relation of speeds of two different elements and has particular relation to apparatus for detecting a differential in excess of a certain amount between the rotational speeds of two different rotary elements, the present application being a division of our prior copending application, Serial No. 354,938, filed August 31, 1940, now Patent 2,277,035.

There are numerous mechanical mechanisms having two rotatable members which normally rotate at or nearly at the same rotational speeds wherein the rotation of one of the two rotatable elements at a speed more than a certain amount greater or less than the speed of the other is undesirable and objectionable.

It is an object of our invention to provide novel mechanism and apparatus for recognizing and detecting a differential of more than a certain amount between the rotational speeds of two rotary elements for a desired purpose, such as controlling the speeds of the two rotary elements in a manner to restore them to speeds having less than the certain differential.

More specifically it is an object of our invention to provide apparatus of the type indicated in the foregoing object and characterized by novel means for detecting a predetermined differential between the frequencies of two separate sources of alternating current having frequencies corresponding respectively to the speeds of the two rotary elements.

In illustrating the utility of our invention we have shown it in connection with a fluid pressure type of brake equipment for railway cars, but it should be understood that this is only one of many possible uses to which our invention may be put.

As is well known, if the brakes are applied on a vehicle wheel to a sufficient degree to exceed the adhesion or rolling friction between the rim of the wheel and road surface or the rails on which the wheel rolls, the wheel decelerates at an abnormally rapid rate to a locked-wheel condition and slides. The term "slip" or "slipping condition" as employed herein refers to the rotation of a vehicle wheel at a speed less than a speed corresponding to vehicle speed at a given instant, whereas the term "slide" or "sliding condition" refers to the dragging of a vehicle wheel along a road surface or rail in a locked condition. The distinction between the two terms should be borne in mind.

Various types of apparatus have been proposed for detecting the slipping condition of a vehicle wheel. One such type of apparatus includes means responsive to the difference in the respective speeds of two separately rotatable vehicle wheels occurring when one of the wheels slip.

Our present invention provides a novel arrangement for detecting the slipping condition of a vehicle wheel by comparison to the speed of a non-slipping wheel and so controlling the brakes as to cause the slipping wheel to be restored to vehicle speed.

The above objects, and other objects of our invention which will be made apparent hereinafter, are attained by means of several embodiments of our invention subsequently to be described and shown in the accompanying drawings, wherein Fig. 1 is a simplified diagrammatic view, showing a brake control equipment for a single railway car, of the two truck type, having one embodiment of my invention applied thereto, Fig. 2 is an enlarged plan view, partly in section, showing details of the commutator devices associated with the individual wheels or wheel units shown in Fig. 1, and Fig. 3 is an enlarged diagrammatic view, showing a modified type of relay which may be substituted for the type of relay device shown in Fig. 1.

Description of embodiment shown in Fig. 1

Figure 3:
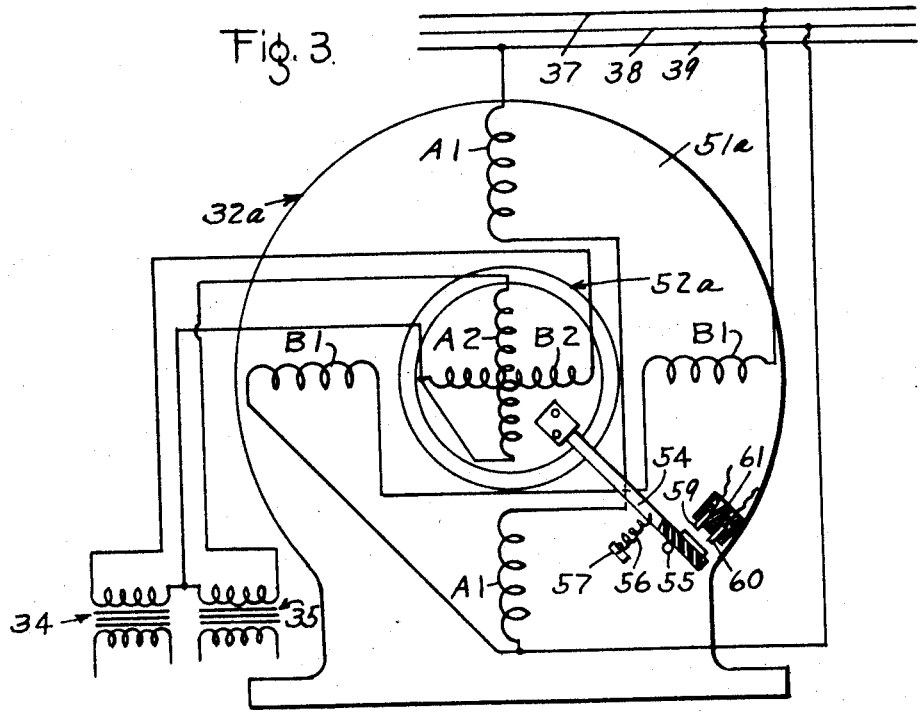

Referring to Fig. 1, the brake control equipment shown therein is that for a single car having a four-wheel truck 11 at one end thereof and a four-wheel truck 12 at the opposite end thereof. Each truck has two separately rotatable wheel units comprising two wheels 13, only one of which is shown in the drawing, connected by and fixed to a connecting axle 14 in conventional manner.

The brakes associated with the wheels 13 may be of the usual clasp type in which the brake shoes are operated into and out of engagement with the rim or tread of the wheels through brake rigging (not shown) in response to the supply of fluid under pressure to and the release of fluid under pressure from brake cylinders 15. The term "wheel unit" as employed herein may designate a single wheel or any number of wheels mechanically connected, as by an axle, to rotate together. In Fig. 1 two brake cylinders are shown for each wheel truck, one brake cylinder being effective to operate the brakes associated with one wheel unit and the other brake cylinder being effective to operate the brakes associated with the other wheel unit of the same truck. Obviously, any desired number of brake cylinders may be employed.

The brake cylinder 15 associated with one of the wheel units of the truck 11 is of smaller diameter than the others so that the effective force thereof for a given fluid pressure supplied to the brake cylinders is less than that of the other brake cylinders. The wheel unit with which this smaller brake cylinder is associated will hereinafter be referred to as the "underbraked wheel unit." The purpose of the smaller brake cylinder for the one wheel unit is to so limit the degree of application of the brakes associated with the wheel unit that at no time can the wheels of this wheel unit slip but rotate at all times in accordance with the speed of travel of the car. The manner in which this feature is utilized will be made apparent hereinafter.

Fluid under pressure may be supplied to the brake cylinders 15 and released therefrom, under the control of the operator of the vehicle, by any suitable apparatus. For simplicity, we have illustrated an apparatus of the straight-air type employing a train pipe, hereinafter referred to as the control pipe 17, to which the brake cylinders 15 are connected by branch pipes 18, and a manually operated brake valve 19 of the self-lapping type for controlling the pressure in the control pipe 17 and the connected brake cylinders 15. The pneumatic brake control equipment further includes a source of fluid under pressure, such as a reservoir 21 that is normally charged to a certain pressure such as one hundred pounds per square inch by means of a fluid compressor not shown, and a train pipe, hereinafter referred to as the supply pipe 22, connected to the reservoir 21 and charged to the pressure therein.

The control pipe 17 and supply pipe 22 extend, in conventional manner, from one end of a car to the other and are provided at the ends thereof with suitable angle cocks 23 and hose couplings 24 for connecting the sections of the pipes on successive cars in the usual manner.

The brake valve 19 is connected to the pipes 17 and 22 by branch pipes 25 and 26 respectively, in each of which a manually operated valve 27 is interposed. The valves 27 are in open position when it is desired to have the brake valve 19 control the pressure in the control pipe 17. When it is desired to control the pressure in the pipe 17 by means of a brake valve corresponding to the brake valve 19 on another car, the valves 27 are closed, thus cutting the brake valve 19 of Fig. 1 out of operation.

The brake valve 19 is of well-known construction and accordingly a functional description thereof is deemed sufficient for the purposes of the present application. The brake valve 19 has an operating handle 19a which is effective when shifted in a horizontal plane to rotate a rotary operating shaft that in turn causes operation of the valve mechanism of the brake valve. When the brake valve handle 19a is in its normal or brake release position, the valve mechanism of the brake valve is conditioned to cause the release of fluid under pressure from the control pipe 17 through an exhaust port and pipe 28 at the brake valve. When the brake valve handle 19a is shifted in a horizontal plane out of its normal position into a so-called application zone, the valve mechanism of the brake valve is operated to cause fluid under pressure to be supplied from the supply pipe 22 and connected reservoir 21 to the control pipe 17 to establish a pressure therein which corresponds substantially to the degree of displacement of the brake valve handle out of its normal position.

If the pressure in the control pipe 17 tends to reduce for some reason, such as leakage, the valve mechanism of the brake valve is automatically operative to maintain a supply of fluid under pressure to the control pipe so that a pressure corresponding to the position of the brake valve handle is maintained in the control pipe 17. This pressure-maintaining feature of the brake valve 19 will be referred to hereinafter.

According to our invention, the equipment shown in Fig. 1 further comprises a magnet valve device 31 interposed in the branch pipe 18 leading to the brake cylinders of each wheel truck, and a relay device 32 for each of the wheel units of the vehicle except the underbraked wheel unit, adapted to control the magnet valve device 31 of the corresponding wheel truck.

The equipment further includes a source of two-phase alternating-current adapted to have a frequency, hereinafter referred to as the master frequency, proportional to the rotational speed of the underbraked wheel unit of wheel truck 11 and, associated with each of the other wheel units of the vehicle an individual source of two-phase alternating-current adapted to have a frequency corresponding to the rotational speed of the corresponding wheel unit and hereinafter referred to as the local frequency. The various sources of two-phase alternating-current may be of any desired and suitable construction. As shown, these sources respectively comprise a commutator or rotary switch device 33 driven according to the rotational speed of the corresponding wheel unit, as by direct connection to the end of the corresponding axle 14 in the manner presently to be described, and a pair of voltage-translating devices or transformers 34 and 35.

The relay devices 32 are so constructed and arranged, as hereinafter to be explained, as to operatively respond to a predetermined difference in the master frequency and the corresponding local frequency which occurs whenever the corresponding wheel unit slips.

Referring in greater detail to the parts of the equipment, the magnet valves 31 for the two wheel trucks are identical and accordingly only that for the wheel truck 11 is shown in detail. Each magnet valve 31 comprises a pair of oppositely seating valves 43 and 44 of the poppet type which are normally biased upwardly by a coil spring 45 to unseated and seated positions respectively. With the valves 43 and 44 so positioned, communication is established through the branch pipe 18 from the control pipe 17 to the brake cylinders 15. Each magnet valve further comprises an electromagnet winding 46 which is effective, when energized, to actuate a plunger 47 to shift the valves 43 and 44 downwardly to seated and unseated positions respectively. With the valves so positioned, the communication through the branch pipe 18 from the control pipe to the brake cylinders is closed and an exhaust communication is established through which fluid under pressure is released to atmosphere from the brake cylinders through an exhaust port 48 at a rapid rate. Upon deenergization of the magnet winding 46, the spring 45 restores the valves to the unseated and seated positions thereof, thereby closing the exhaust communication and reestablishing the supply communication to the brake cylinders.

As diagrammatically shown, each relay device 32 comprises a stator element or frame 51 and a rotor 52. Although not shown in detail, it should be understood that the stator element 51 is similar to the stator of an induction motor and includes a laminated magnetic core structure suitably slotted for receiving the stator windings in the conventional manner. The rotor 52 is similar to a conventional squirrel-cage rotor of an induction motor and is suitably mounted on a shaft 53 journaled in the stator frame 51 in manner not shown. The outside diameter of the rotor 52 is such as to provide a suitable air gap between itself and the magnetic core of the stator element 51.

Mounted in conventional manner in the usual slots of the stator core are two sets of polyphase windings, shown as two-phase windings, diagrammatically indicated for simplicity as phases A and B with either of the suffix numbers 1 and 2 depending upon the particular set of windings. The two-phase windings A1 and B1 may be associated with the two-phase windings A2 and B2 in any suitable manner as by having the conductors of corresponding phase windings received in the same slots at different depths. It will be understood that the stator phase-windings may be distributed in the usual manner of induction or synchronous motor stator windings to provide any desired number of magnetic poles such as 2, 4, 8 etc., within the physical limitation of the device.

Attached to one end of the rotor 52 is a contact arm 54, at least a portion of which is of insulating material. A coil spring 56, secured at one end to the contact arm 54 and at the other end to a lug 57 attached to the stator frame, biases the contact arm in a direction to normally engage a fixed stop 55 on the stator frame 51. A contact 58 fixed on the contact arm 54 is effective to bridge or connect two stationary contacts 59 and 60, carried in insulated relation on the frame 51 as by an insulating member 61, when the arm 54 is shifted in a clockwise direction out of its normal position in response to the rotary movement of the rotor 52.

The phase windings A1 and B1 of each of the relays 32 are connected to three train wires 37, 38 and 39 over which the two-phase alternating-current or master frequency is supplied in a manner presently to be described. The energization of the windings A1 and B1 by a two-phase current is effective, in manner well understood by those skilled in the art of induction motors, to produce a magnetic field which rotates in one direction at a speed corresponding to the frequency of the supply.

The phase windings A2 and B2 are so connected and arranged as to be energized by the local frequency or two-phase alternating-current supplied from the corresponding wheel unit source. The arrangement of the phase windings A2 and B2 is such that upon energization, the magnetic field produced thereby rotates in the opposite direction to that of the magnetic field produced by the phase windings A1 and B1 and at a speed corresponding to the local frequency.

As long as the master frequency supplied to the windings A1 and B1 and the local frequency supplied to the windings A2 and B2 are the same or substantially so, the respective torques exerted on the rotor 52 in response to each of the oppositely rotating magnetic fields produced by the two sets of windings are substantially equal or balanced so that the contact arm 54 remains biased by the spring 56 to the position, as shown, engaging the stop 55 and separating contact 58 from its associated pair of contacts 59 and 60.

When the local frequency supplied to the windings A2 and B2 becomes less than the master frequency supplied to the windings A1 and B1 of a particular relay 32, an unbalanced torque is exerted on the rotor varying in degree according to the difference between the master frequency and local frequency. When a sufficient difference between the master frequency and the local frequency occurs, the unbalanced torque exerted on the rotor 52 is sufficient to overcome the biasing force of the spring 56 and the rotor is accordingly shifted rotarily in a clockwise direction to effect engagement of the contact 58 on the contact arm 54 with the associated pair of stationary contacts 59 and 60.

It is desirable to construct the squirrel-cage rotor 52 of relatively high resistance metal, for reasons well-known to those skilled in the art of induction motors, in order that an adequately high torque be exerted on the rotor 52 in response to a small difference between the master and local frequencies so as to cause engagement of the contact 58 on the contact arm with its associated pair of contacts 59 and 60.

It will be understood that since the underbraked wheel unit of the wheel truck 11 rotates at all times at a speed in accordance with the speed of travel of the car, the master frequency corresponds at all times to the speed of travel of the vehicle. The reduction in the local frequency of the two-phase alternating-current supplied to the phase windings A2 and B2 of each relay 32 accordingly reflects the reduction in speed of the individual wheel unit relative to that of the underbraked wheel unit when the individual wheel unit slips. It will accordingly be seen that whenever any of the wheel units other than the underbraked wheel unit begins to slip, the contact 58 on the contact arm 54 of the corresponding relay 32 is automatically and promptly actuated into engagement with its associated pair of stationary contacts 59 and 60.

The switch formed by the contacts 58, 59 and 60 of each relay 32 serves to control a circuit for energizing and deenergizing the magnet winding 46 of the magnet valve 31 for the corresponding wheel truck. To this end, the contact 60 of each relay 32 is connected to a wire 62 to which one terminal, such as the positive terminal, of a source of direct-current indicated as a storage battery 63 is connected. The contact 59 of the relay 32 associated with the one wheel unit of the wheel truck 11 is connected by a wire 65 to one terminal of the magnet winding 46 of the magnet valve 31 for the wheel truck 11, the opposite terminal of the magnet winding 46 being connected to the opposite terminal of the battery 63 as through a ground connection in the manner shown. The contact 59 of the two relays 32 for the wheel truck 12 are connected to a wire 66 which is connected to one terminal of the magnet winding 46 of the magnet valve 31 for the wheel truck 12, the opposite terminal of the magnet winding of this magnet valve being connected to the opposite terminal of the battery 63 as through a ground connection in the manner shown.

The manner in which a commutator device 33 and its associated pair of transformers 34 and 35 cooperate to supply a two-phase alternating-current having a frequency corresponding to the rotational speed of the corresponding wheel unit will now be briefly described.

Figure 2:
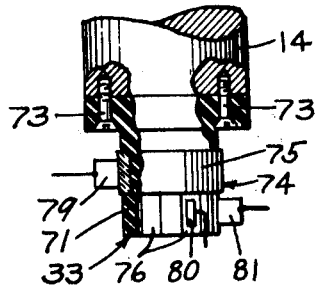

As seen in Fig. 2, each commutator device 33 comprises a cylindrical element 71 of suitable insulating material, such as hard rubber or "Bakelite" having a flange at one end which is secured to one end of a wheel axle 14 as by a plurality of screws 73 in such a manner that the element 71 is coaxial to the axle 14 and rotates in correspondence therewith. Embedded in the element 71 during the moulding operation, or otherwise suitably affixed thereto, is a contact ring 74 having a continuous portion 75 extending circumferentially around the periphery of the element 71 and an interrupted portion comprising a plurality of spaced contact fingers 76. The contact ring 74 is preferably integrally formed of suitable material such as copper, brass or alloys thereof.

As will be seen in Fig. 1, there are eight contact fingers 76 of uniform width and spacing separated by portions of the insulating element 71 intervening therebetween and resembling somewhat the commutator of a conventional direct-current electric motor. It will be understood that any desired number of contact fingers 76 may be provided, eight being shown merely for purposes of illustration.

Arranged in a suitable brush holder, not shown, are three brushes 79, 80 and 81, the brush holder being in turn suitably supported within the journal casing (not shown) at the end of each wheel axle. Brush 79 is so arranged and mounted as to constantly engage only the continuous portion 75 of the contact ring 74, whereas the brushes 80 and 81 are arranged in displaced relation thereto so as to engage only the contact fingers 76 of the contact ring 74.

The brushes 80 and 81 may occupy any angular position relative to each other as long as they are displaced the equivalent of ninety electrical degrees apart. As will be explained more fully presently, each contact finger 76 is of a width corresponding to one hundred and eighty electrical degrees and each intervening portion of the insulating element 71 between successive contact fingers 76 is likewise of a width corresponding to one hundred and eighty electrical degrees.

The brush 79 of each commutator device 33 is connected by a branch wire 85 to a bus or train wire 86 which is constantly connected by a branch wire 87 to one terminal, for example the positive terminal, of a suitable source of direct-current voltage, such as storage battery 88.

The brush 80 is connected by a wire 89 to one terminal of the primary winding 34p of the associated transformer 34, the other terminal of the primary winding of the transformer being connected to a bus wire 91 that is constantly connected to the negative terminal of the battery 88.

In a similar manner, the brush 81 is connected by a wire 92 to one terminal of the primary winding 35p of the associated transformer 35, the other terminal of the primary winding of the transformer being connected to the bus wire 91.

A suitable condenser 93 is connected between the brush 79 and the brush 80, and a similar condenser 93 is connected between the brush 79 and the brush 81, for the purpose of reducing arcing at the brushes 80 and 81 when the brushes disengage the contact fingers 76.

It will thus be seen that as a commutator device 33 rotates, the primary windings 34p and 35p of the corresponding pair of transformers are successively energized and deenergized at a frequency depending upon the speed of rotation of the commutator device, which is in turn proportional to the speed of rotation of the associated wheel unit. It will also be seen that due to the fact that the brushes 80 and 81 are arranged in a manner to be separated ninety electrical degrees the successive cycles of energization and deenergization of the primary windings 34p and 35p of each pair of transformers 34 and 35 are respectively displaced ninety electrical degrees and that consequently the alternating-current voltage cycles induced in the corresponding secondary windings 34s and 35s of the transformers are likewise displaced ninety electrical degrees in the manner characteristic of two-phase alternating-current.

In the case of the underbraked wheel unit of the wheel truck 11, the secondary windings 34s and 35s are so connected to the train wires 37, 38 and 39 as to provide the two-phase alternating-current or master frequency supply to the phase windings A1 and B1 of all the relays 32.

A speedometer 95, in the form of a frequency meter, is connected across the wires 37 and 38 to record the frequency in one of the phases. For convenience, the scale of the speedometer is calibrated in miles per hour. Since the underbraked wheel unit of truck 11 always rotates at a speed corresponding to vehicle speed, it will be apparent that the speedometer 95 indicates the speed of the vehicle. Speedometer 95 may be located in a convenient location adjacent the brake valve 19 in the control cab of the vehicle so as to be visible by the operator at all times.

In the case of each of the wheel units other than the underbraked wheel unit, the secondary windings 34s and 35s of the corresponding pair of transformers are so arranged and connected as to supply a two-phase alternating-current, having a frequency corresponding to the speed of rotation of the wheel unit and referred to hereinbefore as the local frequency, to the phase windings A2 and B2 of the corresponding relays 32.

The ratio of the number of turns in the primary and secondary windings of the transformers 34 and 35 in uniform so that the voltage across any one phase of either the master frequency source or the local frequency source is substantially the same.

In view of the fact that the source of master frequency associated with the underbraked wheel unit supplies power to the phase windings A1 and B1 of all of the relays 32 whereas the sources of local frequency are required to supply power only to the one set of phase windings A2 and B2 of the corresponding relay, it may be desirable to provide a two-phase alternating-current generator driven according to the speed of rotation of the underbraked wheel unit so as to obtain adequate power to properly energize the phase windings A1 and B1 of all of the relays on the vehicle. It is necessary, however, that the voltage characteristic of the generator simulate closely the voltage characteristic of the sources of local frequency.

If it is desired to have the vehicle travel in either a forward or a reverse direction it is necessary to provide suitable reversing switch means (not shown) preferably automatically responsive to a change in direction of rotation of the wheel axles or of the wheels themselves, to reverse the connections to one of the phase windings of each set on the relays 32, such as the connections to phase windings A1 and A2.

The necessity for reversing the connections to one of the phase windings of each group upon reversal of the direction of rotation of the vehicle wheels will be apparent from the fact that the phase rotation of the polyphase voltages supplied to the respective sets of windings of the relays 32 reverses with a reversal of direction of rotation of the wheels 13, which in turn results in a reversal of the direction of application of the torques respectively exerted by the two sets of windings of the relays on the rotor 52 thereof.

In order to cause the rotor 52 to move in the right direction to effect engagement of the contact 58 with the stationary contacts 59 and 60 when wheel slip occurs, the respective torques exerted by the two sets of windings of the relays must not change their direction of application with reversal of wheel rotation. Accordingly, by changing the connection of one phase winding of each set upon reversal of wheel rotation, the phase rotation and the direction of application of the torques exerted by the respective sets of windings is maintained unchanged and consequently the rotor 52 will always be shifted in the proper direction when wheel slip occurs.

*Operation of equipment shown in Fig. 1*

Let it be assumed that a single car having the equipment shown in Fig. 1 is traveling along the road under power with the brake valve handle 19a in its brake release position and that the operator desires to effect an application of the brakes. To do so, the operator first shuts off propulsion power and then operates the brake valve handle 19a into the application zone an amount corresponding to the desired degree of application of the brakes. The control pipe 17 is accordingly charged to a pressure corresponding to the position of the brake valve handle, for example fifty pounds per square inch. Being connected through the branch pipes 18 to the control pipe, brake cylinders 15 are charged with fluid at a pressure equal to that in the control pipe and thus effect application of the brakes associated with the wheels 13 to a corresponding degree.

As long as the wheel units continue to rotate at a speed corresponding to car speed without slipping, the magnet valves 31 remain deenergized and consequently no variation of the pressure in the brake cylinders 15 occurs except that resulting from variations of the pressure in the control pipe 17 by operations of the brake valve 19.

If during an application of the brakes, however, any of the wheel units other than the underbraked wheel unit begins to slip, the reduction in the local frequency supplied to the phase windings A2 and B2 of the corresponding relay 32 with respect to the master frequency supplied to the phase windings A1 and B1 results in operation of the contact arm 54 of the relay to establish the previously described circuit for energizing the magnet winding of the magnet valve 31 for the corresponding wheel truck. The magnet valve 31 is accordingly operated to cut-off the supply of fluid under pressure to the brake cylinders of the truck having the slipping wheels and at the same time rapidly exhaust fluid under pressure from the brake cylinders.

In view of the fact that operation of the contact arm 54 of the relay 32 is effected whenever the local frequency supplied to the phase windings A2 and B2 reduces a small percentage below the master frequency supplied to the phase windings A1 and B1, the fluid pressure is so promptly and so rapidly reduced in the affected brake cylinders that the slipping wheels do not decelerate to a locked condition but begin to accelerate back toward a speed corresponding to the car speed before reaching the locked condition.

As long as the rotational speed of the slipping wheel or wheel unit varies by more than the certain low percentage from the rotational speed of the underbraked wheel unit, the contact arm 54 of the relay 32 corresponding to the slipping wheel unit will remain in closed position so that the magnet winding of the magnet valve 31 of the corresponding wheel truck remains energized. Fluid under pressure will accordingly continue to be vented from the brake cylinders of the truck having the slipping wheels until the slipping wheels are restored substantially to a speed corresponding to car speed.

This, even if a slipping wheel unit should decelerate momentarily to a locked condition, it cannot remain in a locked condition because the fluid under pressure continues to be released from the brake cylinders associated therewith until such time as it is restored substantially to vehicle speed.

When the slipping wheel unit is restored substantially to a speed corresponding to car speed, the contact arm 54 of the corresponding relay 32 is restored to its normal position interrupting the energizing circuit for the magnet winding 46 of the magnet valve 31 for the corresponding truck. The magnet valve 31 is accordingly restored to its normally position closing the exhaust communication and restoring the supply communication to the brake cylinders. Fluid under pressure is accordingly resupplied from the control pipe 17 to the brake cylinders of the truck having the slipping wheel unit. Such supply of fluid under pressure to the brake cylinders tends to reduce the pressure in the control pipe 17 but due to the pressure-maintaining feature of the brake valve 19, fluid under pressure is automatically supplied to the control pipe 17 to maintain a pressure therein corresponding to the position of the brake valve handle, notwithstanding the supply of fluid under pressure from the control pipe to the brake cylinders. Thus when a slipping wheel is restored to a speed corresponding to car speed, the pressure restored in the brake cylinders again corresponds to that established in the control pipe 17.

If upon the restoration of the pressure in the brake cylinders, the wheel unit again begins to slip, the above operation is repeated. At no time, therefore, are the wheels permitted to reach or remain in a locked condition and slide.

When a vehicle comes to a stop in response to application of the brakes, the operator of the vehicle may operate the brake valve 19 to reduce the pressure in the control pipe 17 so as to correspondingly reduce the pressure in the brake cylinders and the degree of application of the brakes to prevent undesired surge at the time of stopping. After the vehicle has been brought to a complete stop, the operator may increase the pressure in the control pipe 17 and brake cylinders 15 to effect any desired degree of application of the brakes so as to hold the vehicle on any grade encountered in service.

In order to release the brakes prior to again starting the vehicle, the operator merely shifts the brake valve handle 19a to its brake release position. The pressure in the control pipe 17 and correspondingly in the brake cylinders 15 is reduced to atmosphere by the exhaust of fluid under pressure through the exhaust port and pipe 28 in the brake valve and the brakes are thus completely released.

*Adaptation of equipment to a train of cars*

In the case of a train of cars, the equipment shown in Fig. 1 may be utilized in several ways. For example, in the case of modern high speed streamlined trains of the articulated type in which a particular group of cars and a locomotive remain coupled and do not operate ordinarily except in such trains, the train wires 37, 38 and 39 may be extended throughout the train, with suitable flexible couplers 41 connecting the sections on successive cars, and only one two-phase master frequency supply provided as on the locomotive. In a similar manner, the bus wires 86 and 91 may be extended throughout all cars of the train so that only one source corresponding to the battery 88 is required on one of the cars, such as the locomotive. Likewise the wire 62 may be extended throughout all cars of the train so that only one source of current corresponding to the battery 63 need be provided on one of the cars, such as the locomotive, for energizing the magnet windings of the magnet valves 31 on the several cars.

On the other hand, if desired, each car may operate as a separate unit with respect to the control of the relays 32 thereon. In such case, each car requires a master frequency supply corresponding to that associated with the underbraked wheel unit in Fig. 1 and no connection between the section of wires 37, 38, 39, 62, 86 and 91 on the several cars need be effected. In addition, each car would be provided with separate sources of direct-current corresponding to the batteries 63 and 88.

Modification shown in Fig. 3

Referring to Fig. 3, a modified form of relay 32a may be provided in place of the relays 32 in Fig. 1. The relay 32a differs from the relay 32 in that a wound rotor 52a is provided instead of the squirrel-cage rotor 52. The windings on the rotor 52a are two-phase in character and designated A2 and B2 for the reason that current is supplied thereto by the local source of two-phase current associated with the corresponding wheel unit. In view of the fact that the rotary movement of the rotor 52a is small, flexible lead wires are provided to connect the secondary windings 34s and 35s of the local source of two-phase current to the phase windings A2 and B2. If desired, however, the rotor 52a may be provided with three conventional collector rings to which the phase windings A2 and B2 are respectively connected; and the connections to the secondary windings of the transformers 34 and 35 may be made through brushes contacting the three collector rings in manner not shown.

The phase windings A1 and B1 are arranged in the stator frame 51a in the same manner as in the relay 32.

The phase windings A1 and B1 of relay 32a produce a rotating magnetic field which causes a torque to be exerted on the rotor 52a in a direction to operate the contact arm 54 in a counterclockwise direction so as to effect engagement of the contact 58 thereon with the associated pair of stationary contacts 59 and 60.

The phase windings A2 and B2 on the rotor 52a are so arranged and connected as to produce a magnetic field rotating in the opposite direction and causing a torque to be exerted on the rotor 52a in the opposite direction and maintaining the contact arm 54 in engagement with the stop 55 as long as the respective frequencies of the two-phase current supplied to the phase windings in the stator and in the rotor do not differ by more than a certain small percentage.

When a wheel unit slips and the frequency of the two-phase current supplied to the phase windings A2 and B2 on the rotor 52a is reduced relative to the frequency of the two-phase current supplied to the stator phase windings A1 and B1, the unbalanced torque exerted on the rotor 52a by the stator phase windings A1 and B1 causes the contact arm 54 to be shifted in a counterclockwise direction to effect the engagement of the contact 58 on the contact arm with the associated pair of contacts 59 and 60.

Summary

Summarizing, it will be seen that we have provided a novel arrangement for detecting a differential in the speeds of two separately rotatable elements. This arrangement comprises a relay of the induction motor type in either of two forms. In one form, one set of two-phase windings is arranged in the stator portion of the relay and energized by a two-phase supply at a frequency proportional to the speed of one of the rotatable elements so as to produce a magnetic field rotatable in one direction and exerting a torque on a squarrel-cage rotor in a corresponding direction. Another set of two-phase windings is arranged in the stator of the relay and energized at a frequency corresponding to the rotational speed of the other rotary element so as to produce a magnetic field rotating in the opposite direction and exerting an equivalent or slightly greater torque in the opposite direction on the squirrel-cage rotor.

As long as the frequency of the two-phase alternating current supplied respectively to the two sets of two-phase windings does not differ by more than a certain percentage, the squirrel-cage rotor remains in a certain normal position maintaining a contact arm thereof in circuit-open position. When the frequency of the two-phase supply to one of the sets of windings differs by more than a certain amount from the frequency of the two-phase supply to the other set of windings, the unbalanced torque on the rotor rotates it a limited amount in a corresponding direction to effect movement of the contact arm to a circuit-closing position.

We have utilized the above-described arrangement to compare the rotational speeds of individual wheel units on a vehicle with the rotational speed of a wheel unit which rotates at all times in correspondence with the speed of the vehicle as a means for detecting the slipping condition of the wheels and effecting a rapid reduction in the degree of application associated with the slipping wheels so as to cause them to be restored to a speed corresponding to vehicle speed without decelerating to a locked condition and sliding.

A modified form of two-phase relay of the induction motor type for detecting the difference in rotational speeds of two rotary elements is provided which differs from the first form in that the one set of phase windings is provided in the stator of the relay and the other set of phase windings is provided on the rotor of the relay.

While we have illustrated our invention in connection with a specific form of brake control equipment, it will be understood that the specific form of brake control shown and described is immaterial and that other types of brake control equipment may also be provided without departing from the spirit of our invention. It will also be clear that while our invention has been illustrated and applied particularly in connection with a brake control equipment for vehicles, that the basic principles thereof may be employed in other situations wherever it is desired to detect a difference in the rotational speeds of two separately rotatable elements. It is accordingly not our intention to limit the scope of our invention except in accordance with the terms of the appended claims.

Having now described our invention, what we claim as new and desire to secure by Letters Patent is:

1. Apparatus for detecting a difference in the rotational speeds of two separately rotatable elements comprising, in combination, means for supplying a polyphase voltage at a frequency proportional to the rotational speed of one of said rotatable elements; means for supplying a polyphase voltage at a frequency proportional to the rotational speed of the other of said two rotatable elements; and a relay device of the induction motor type having one set of polyphase stator windings energized by current supplied from one of said polyphase voltage supply means to produce a magnetic field rotating in one direction, a second set of polyphase stator windings energized by current supplied from the other of said polyphase voltage supply means so as to produce a magnetic field rotating in the opposite direction, and a rotor subject in substantially balanced relation to the opposing torques exerted thereon by said rotating magnetic fields and maintained in a given position as long as the frequencies of the polyphase currents supplied to the two sets of windings respectively do not differ by more than a certain amount and operative out of its normal position upon the occurrence of a predetermined difference in the frequencies of the polyphase currents supplied to the two sets of windings respectively.

2. Apparatus for detecting a difference in the rotational speeds of two rotary elements comprising, in combination, means for supplying a polyphase voltage at a frequency proportional to the rotational speed of one of the rotary elements; means for supplying a polyphase voltage at a frequency proportional to the rotational speed of the other of said rotary elements; and a relay device of the induction motor type having a stator provided with two sets of polyphase windings, one of which sets of windings is energized by current supplied from one of said polyphase supply means and adapted to produce a magnetic field rotating in one direction and the other of which sets of windings is energized by current supplied from the other of said polyphase supply means and adapted to produce a magnetic field rotating in the opposite direction, a rotor on which the torque forces resulting from the two rotating magnetic fields are exerted in opposing substantially balanced relation as long as the frequencies of the polyphase currents supplied to the two sets of windings do not differ by more than a predetermined amount and adapted to be rotarily moved out of its normal position upon the occurrence of a predetermined difference in the frequencies of the polyphase voltages supplied to the two sets of windings respectively, and switch means operated in response to the rotary movement of the said rotor.

3. Apparatus for detecting a difference in the frequency of two polyphase voltage sources comprising, in combination, a stator element having two sets of windings, one of which sets of windings is energized by current supplied from one of said sources and is effective to produce a magnetic field rotating in one direction and the other of which sets of windings is energized by current supplied from the other of said sources and is adapted to produce a magnetic field rotating in the opposite direction, and a rotary element on which the torque forces resulting from the rotating magnetic fields are exerted in opposing substantially balanced relation as long as the frequency of the two voltage sources does not differ by more than a certain amount and which is shifted out of a certain position upon the occurrence of a difference between the frequency of said sources of more than said certain amount.

4. Apparatus for comparing the frequency of one polyphase voltage source to a frequency of a second polyphase voltage source, said apparatus comprising the combination of a first set of polyphase stator windings effective when energized by current supplied from one of said voltage sources to produce a magnetic field rotating in one direction, a second set of polyphase stator windings effective when energized by current supplied from the other of said voltage sources to produce a magnetic field rotating in the opposite direction, and a rotor of the squirrel-cage type associated with said sets of windings in a manner such that torque forces are exerted thereon due to said rotating magnetic fields, the direction of torque in each case corresponding to the direction of rotation of the magnetic field and varying in degree according to the speed of rotation of the magnetic field, said rotor remaining stationary due to the substantially balanced relation of the torque forces thereon when the respective frequencies of the two voltage sources do not differ by more than a certain amount and being moved rotarily due to the unbalanced torque forces thereon occurring when the respective frequencies of the two voltage sources differs by more than said certain amount.

5. A device for registering the relation of the frequency of one polyphase voltage source to the frequency of a second polyphase voltage source, said device comprising the combination of a first set of polyphase stator windings effective when energized by current supplied from one of the voltage sources to produce a magnetic field rotating in one direction at a speed corresponding to the frequency of the voltage source, a second set of polyphase stator windings effective when energized by current supplied from the other of said voltage sources to produce a magnetic field rotating in the opposite direction at a speed corresponding to the frequency of the said other voltage source, a rotor of the squirrel-cage type associated with said one and said other sets of polyphase stator windings in a manner to have opposing torques exerted thereon in response to the rotation of the respective magnetic fields which torque forces vary respectively in accordance with the rotational speed of the corresponding magnetic fields, resilient means cooperating with said rotor to maintain it in a certain normal position as long as the torque forces exerted thereon are in substantially balanced relation and yieldingly permitting a rotative movement of the rotor out of said normal position in response to an unbalance between the respective torque forces exerted on the said rotor exceeding a certain amount, and switch means operative in response to a predetermined displacement of said rotor out of its said certain position.

JOHN CANETTA,
PAUL N. BOSSART.